United States Patent
Fujimoto et al.

(10) Patent No.: US 12,393,416 B2
(45) Date of Patent: Aug. 19, 2025

(54) UPDATING SOFTWARE IN A WIRELESS SWITCHING CONTROL SYSTEM

(71) Applicant: TOYOTA JIDOSHA KABUSHIKI KAISHA, Toyota (JP)

(72) Inventors: Takayuki Fujimoto, Seto (JP); Masaki Miyake, Toyota (JP); Tomoki Shibutani, Nissin (JP); Kazuyoshi Shiohara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 233 days.

(21) Appl. No.: 18/297,768

(22) Filed: Apr. 10, 2023

(65) Prior Publication Data

US 2023/0342138 A1    Oct. 26, 2023

(30) Foreign Application Priority Data

Apr. 21, 2022 (JP) .................... 2022-070246

(51) Int. Cl.
*G06F 8/65* (2018.01)
*G06F 8/71* (2018.01)
*H04L 67/12* (2022.01)

(52) U.S. Cl.
CPC .......... *G06F 8/65* (2013.01); *G06F 8/71* (2013.01); *H04L 67/12* (2013.01)

(58) Field of Classification Search
CPC .............. G06F 8/65; G06F 8/71; H04L 67/12
See application file for complete search history.

(56) References Cited

U.S. PATENT DOCUMENTS

| 9,715,378 B2* | 7/2017 | Dickerson ................. G06F 8/65 |
| 10,037,203 B1* | 7/2018 | Chavez .................... G06F 8/656 |
| 2017/0262277 A1 | 9/2017 | Endo et al. |
| 2018/0173182 A1* | 6/2018 | Miller .................... H04W 4/00 |
| 2022/0004375 A1 | 1/2022 | Satoh et al. |
| 2022/0012039 A1 | 1/2022 | Fukuyo et al. |

(Continued)

FOREIGN PATENT DOCUMENTS

| JP | 2017-167646 A | 9/2017 |
| JP | 2021-124829 A | 8/2021 |

(Continued)

*Primary Examiner* — Qing Chen
*Assistant Examiner* — Travis Viet Tran
(74) *Attorney, Agent, or Firm* — Oblon, McClelland, Maier & Neustadt, L.L.P.

(57) ABSTRACT

A control system configured to update software by wireless communication includes a plurality of specific control devices each including one or more memories configured to store specific software, and one or more processors configured to execute the specific processing by executing the specific software; and a switching control device. The switching control device configured to, when an update of the specific software stored in the one or more memories of the specific control device executing the specific processing is to be performed, switch the specific control device executing the specific processing to another specific control device before starting of the update. The one or more processors of the specific control device are configured to, in a state where the specific control device executing the specific processing has been switched to the other specific control device, update the specific software.

10 Claims, 4 Drawing Sheets

(56) References Cited

U.S. PATENT DOCUMENTS

| | | | |
|---|---|---|---|
| 2022/0063646 A1 | 3/2022 | Ishikawa | |
| 2023/0273787 A1* | 8/2023 | Wilhelmsson | G06F 8/65 717/168 |
| 2024/0190475 A1* | 6/2024 | Hamada | B60W 60/0027 |
| 2024/0403027 A1* | 12/2024 | Shiozawa | B60R 16/02 |

FOREIGN PATENT DOCUMENTS

| | | |
|---|---|---|
| JP | 2022-12834 A | 1/2022 |
| JP | 2022-22833 A | 2/2022 |
| JP | 2022-41194 A | 3/2022 |

* cited by examiner

UPDATING SOFTWARE IN A WIRELESS SWITCHING CONTROL SYSTEM

CROSS-REFERENCE TO RELATED APPLICATION

This application claims priority to Japanese Patent Application No. 2022-070246 filed on Apr. 21, 2022, incorporated herein by reference in its entirety.

BACKGROUND

1. Technical Field

The present disclosure relates to a control system, an update control method, and a non-transitory storage medium.

2. Description of Related Art

A technique called over the air (OTA) is known, in which data for updating is wirelessly communicated between an update server and a vehicle when updating software for controlling the vehicle. Using this technique, in a related art, a vehicle starts restricting operations of some or all of the autonomous driving function or the driver assistance function before updating software on an autonomous driving function or a driver assistance function of the vehicle, and releases the restriction after the update is completed (see, for example, Japanese Unexamined Patent Application Publication No. 2017-167646 (JP 2017-167646 A)).

SUMMARY

However, in a vehicle control system disclosed in JP 2017-167646 A, there is a possibility that vehicle control being influenced because the vehicle function is restricted when the software is updated.

The present disclosure provides a control system, an update control method, and a non-transitory storage medium that can restrict control of a control system from being influenced when update of software of the control system is updated.

A first aspect according to the present disclosure is a control system configured to update software by wireless communication. The control system includes a plurality of specific control devices each including one or more memories configured to store specific software for executing specific processing for controlling a control target and one or more processors configured to execute the specific processing by executing the specific software stored in the one or more memories, and a switching control device configured to switch, among the specific control devices, a specific control device that executes the specific processing. When an update of the specific software stored in the one or more memories of the specific control device executing the specific processing among the specific control devices is to be performed, the switching control device switches, among the specific control devices, the specific control device executing the specific processing to another specific control device before starting the update. The one or more processors of the specific control device is configured to, in a state where the specific control device executing the specific processing has been switched to the other specific control device, update the specific software stored in the one or more memories.

A second aspect of the present disclosure is an update control method in a control system configured to update software by wireless communication. The control system includes a plurality of specific control devices each including one or more memories configured to store specific software for executing specific processing for controlling a control target and one or more processors configured to execute the specific processing by executing the specific software stored in the one or more memories, and a switching control device configured to switch, among the specific control devices, a specific control device that executes the specific processing. When the switching control device performs an update of the specific software stored in the one or more memories of the specific control device executing the specific processing among the specific control devices, the update control method includes switching, among the specific control devices, the specific control device that executes the specific processing to another specific control device before starting the update, and updating, by the one or more processors of the specific control device, the specific software stored in the one or more memories in a state where the specific control device that executes the specific processing has been switched to the other specific control device.

A third aspect of the present disclosure is a non-transitory storage medium storing instructions that are executable in one or more processors of a control system configured to update software by wireless communication and that cause the one or more processors to execute functions. The control system includes a plurality of specific control devices each including one or more memories configured to store specific software for executing specific processing for controlling a control target and one or more processors configured to execute the specific processing by executing the specific software stored in the one or more memories, and a switching control device configured to switch, among the specific control devices, a specific control device that executes the specific processing. The functions include switching, among the specific control devices, when the switching control device performs an update of the specific software stored in the one or more memories of the specific control device executing the specific processing among the specific control devices, the specific control device that executes the specific processing to another specific control device before starting the update, and updating, by the one or more processors of the specific control device, the specific software stored in the one or more memories in a state where the specific control device that executes the specific processing has been switched to the other specific control device.

With each aspect of the present disclosure, when software of a control system is updated, it is possible to provide a control system, an update control method, and a non-transitory storage medium that can restrict control in the control system from being influenced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinbelow, embodiments of the present disclosure will be described with reference to drawings. In the following description, the same parts are denoted with the same reference signs. Their names and functions are also the same. A detailed description thereof will therefore not be repeated.

Figure 1:
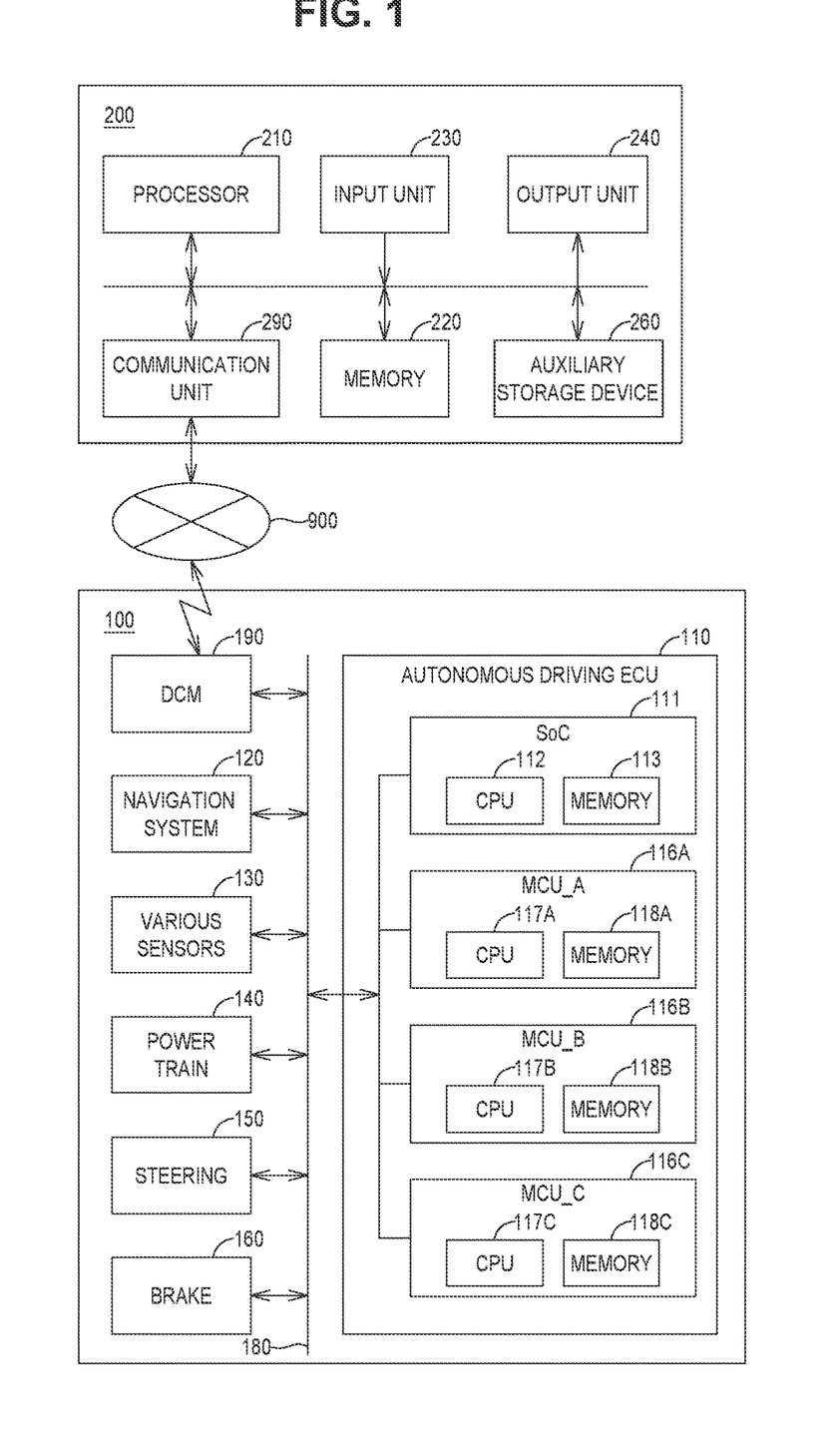
FIG. 1 is a block diagram illustrating a schematic configuration of an over the air system used for updating software for controlling a vehicle according to the present embodiment.

FIG. 1 is a block diagram illustrating a schematic configuration of an over the air (OTA) system used for updating software for controlling a vehicle according to the present embodiment. With reference to FIG. 1, the OTA system includes a plurality of vehicles 100 and an update server 200.

The vehicle 100 includes an autonomous driving electronic control unit (ECU) 110, a navigation system 120, various sensors 130, a power train system 140, a steering system 150, a brake system 160, and a data communication module (DCM) 190. The autonomous driving ECU 110, the navigation system 120, the various sensors 130, the power train system 140, the steering system 150, the brake system 160, and the DCM 190 are configured to be communicable with each other via an in-vehicle communication network 180, such as a controller area network (CAN).

The DCM 190 is a device that can wirelessly communicate with an external device, such as the update server 200, via a communication network 900, such as the Internet, and transmits and receives predetermined information to and from the external device.

The power train system 140 includes a drive source, such as a motor generator or an engine, a transmission that transmits a drive force from the drive source to wheels, and an ECU that controls the drive source and the transmission. The ECU of the power train system 140 controls the drive source such that a shift range is switched according to a signal indicating an operation amount of an accelerator pedal and a signal indicating operation content of a shift lever, or a control signal from the autonomous driving ECU 110, and the required drive force is generated.

The steering system 150 includes a steering device that steers the wheels and an ECU that controls the steering device such that a steering angle of the wheels becomes the required steering angle according to a signal indicating an operation amount of a steering wheel or the control signal from the autonomous driving ECU 110.

The brake system 160 includes a brake device that brakes the wheels and an ECU that controls the brake device, and controls the brake device such that the required brake force is generated according to a signal indicating an operation amount of a brake pedal or the control signal from the autonomous driving ECU 110.

The various sensors 130 include a sensor configured to detect an external situation of the vehicle 100, and a sensor (neither shown) configured to detect information according to a traveling state of the vehicle 100, the steering operation, an accelerator operation, and the brake operation. Specifically, the various sensors 130 may include, for example, a camera, a radar, a laser imaging detection and ranging (LIDAR), a vehicle speed sensor, an acceleration sensor, and a yaw rate sensor (none of which is shown).

The navigation system 120 includes a global positioning system (GPS) receiver, a map information database, a traffic information receiver, and a processor. The GPS receiver specifies a position of the vehicle 100 based on radio waves from an artificial satellite. The navigation system 120 transmits, to the autonomous driving ECU 110, position information of the vehicle 100 on the map information database specified by the GPS receiver, and road traffic information received by the traffic information receiver. The road traffic information may be, for example, road traffic information (for example, VICS® information) provided by, for example, FM multiplex broadcasting, and/or road traffic information collected from a probe vehicle or a probe center. This road traffic information includes at least traffic congestion information, and may also include road regulation information, parking lot information, or the like.

The autonomous driving ECU 110 includes a system-on-a-chip (SoC) 111 and a plurality of micro controller units (MCUs). In the present embodiment, the autonomous driving ECU 110 includes three MCUs 116A to 116C (referred to as an MCU_A, an MCU_B, and an MCU_C in the drawings) as MCUs. The SoC 111 includes a CPU 112 and a memory 113. The number of the CPUs of the SoC 111 and the number of the memories of the SoC 111 are respectively not limited to one. The MCUs 116A to 116C include CPUs 117A to 117C and memories 118A to 118C, respectively. The number of the CPUs of each MPUs and the number of the memories of each MPUs are respectively not limited to one.

The memories 113 and 118A to 118C respectively include, for example, random access memories (RAMs), read-only memories (ROMs), flash memories, and store, for example, software, such as programs executed in the SoC 111 and the MCUs 116A to 116C, and data of processing targets.

The CPUs 112 and 117A to 117C respectively process data input to the SoC 111 and the MCUs 116A to 116C or data stored in the memories 113 and 118A to 118C according to programs stored in the memories 113 and 118A to 118C, and output data resulting from the processing to the outside of the SoC 111 and the MCUs 116A to 116C, or store it in the memories 113 and 118A to 118C.

The autonomous driving ECU 110 controls the vehicle 100 such that it autonomously travels from a current place to a specified destination. Specifically, using information from the various sensors 130 and the navigation system 120, the SoC 111 creates a route plan from the current place to the destination, recognizes targets, such as another vehicle, a person, an animal, and an obstacle surrounding the vehicle 100, specifies a movement of the vehicle 100 according to surrounding targets and the route plan, and delivers the specified movement of the vehicle 100 to the MCUs 116A to 116C. The MCUs 116A to 116C calculate control amounts of drive, steering, and brake that realize the delivered movement of the vehicle 100, and transmit control signals indicating the calculated control amounts to the power train system 140, the steering system 150, and the brake system 160.

The update server 200 updates software for controlling the vehicle 100. The update server 200 includes a processor 210, a memory 220, an input unit 230, an output unit 240, an auxiliary storage device 260, and a communication unit 290.

The memory 220 includes, for example, a RAM, a ROM, and a flash memory, and stores, for example, software, such as a program executed in the update server 200, and data of a processing target.

The auxiliary storage device 260 includes, for example, a hard disk drive (HDD), a solid state drive (SSD), and a removable media drive, and assists the memory 220, stores the software, such as the program executed in the update server 200, and data of the processing target, and stores a large amount of data compared to the memory 220.

The input unit 230 includes input devices, such as a keyboard and a mouse, and transmits information input from the input devices by a user to the processor 210.

The output unit 240 includes output device, such as a display and a speaker, and outputs information received from the processor 210 to the output devices.

The communication unit 290 is a device that can communicate with an external device, such as the vehicle 100, via the communication network 900, such as the Internet, and transmits and receives predetermined information to and from the external device.

The processor 210 processes data from the input unit 230 or the communication unit 290, or data stored in the memory 220 or the auxiliary storage device 260 according to a program stored in the memory 220 or the auxiliary storage device 260, and outputs the data to the output unit 240 or the communication unit 290, or stores the data in the memory 220 or the auxiliary storage device 260.

In the present embodiment, when the software for controlling the vehicle 100 is updated, data for the update is transmitted and received between the update server 200 and the vehicle 100 according to OTA technology. Using this OTA technology, when software on a driving assistance function or an autonomous driving function by an advanced driver-assistance system (ADAS) of the vehicle is updated, there has been the vehicle 100 that starts restricting operations of some or all of the driver assistance function or the autonomous driving function or the driving and releases the restriction after the update is completed.

However, in the control system of the vehicle 100, since a function of the vehicle 100 is limited when the software is updated, there is a problem of the control of the vehicle 100 being influenced.

Therefore, when an update of the specific software stored in the memory (hereinafter, referred to as the memory 118) of the MCU (hereinafter, referred to as the MCU 116) that is executing the specific processing for controlling control targets (the power train system 140, the steering system 150, and the brake system 160) among MCUs 116A to 116C is to be performed, the SoC 111 switches the MCU 116 executing the specific processing to another specific control device before the update is started. In a state where the MCU 116 executing the specific processing has been switched to another MCU, the CPU (hereinafter, referred to as the CPU 117) of the MCU 116 updates the specific software stored in memory 118.

As such, when the specific software of the MCU 116 that is executing the specific processing for controlling the control target is updated, the MCU 116 executing the specific processing is switched to another specific control device MCU 116 before the start of the update, and, in the state where the MCU 116 executing the specific processing has been switched to the other MCU 116, the specific software is updated. As a result, when the software of the autonomous driving ECU 110 is updated, it is possible to restrict the control in the autonomous driving ECU 110 from being influenced.

Figure 2:
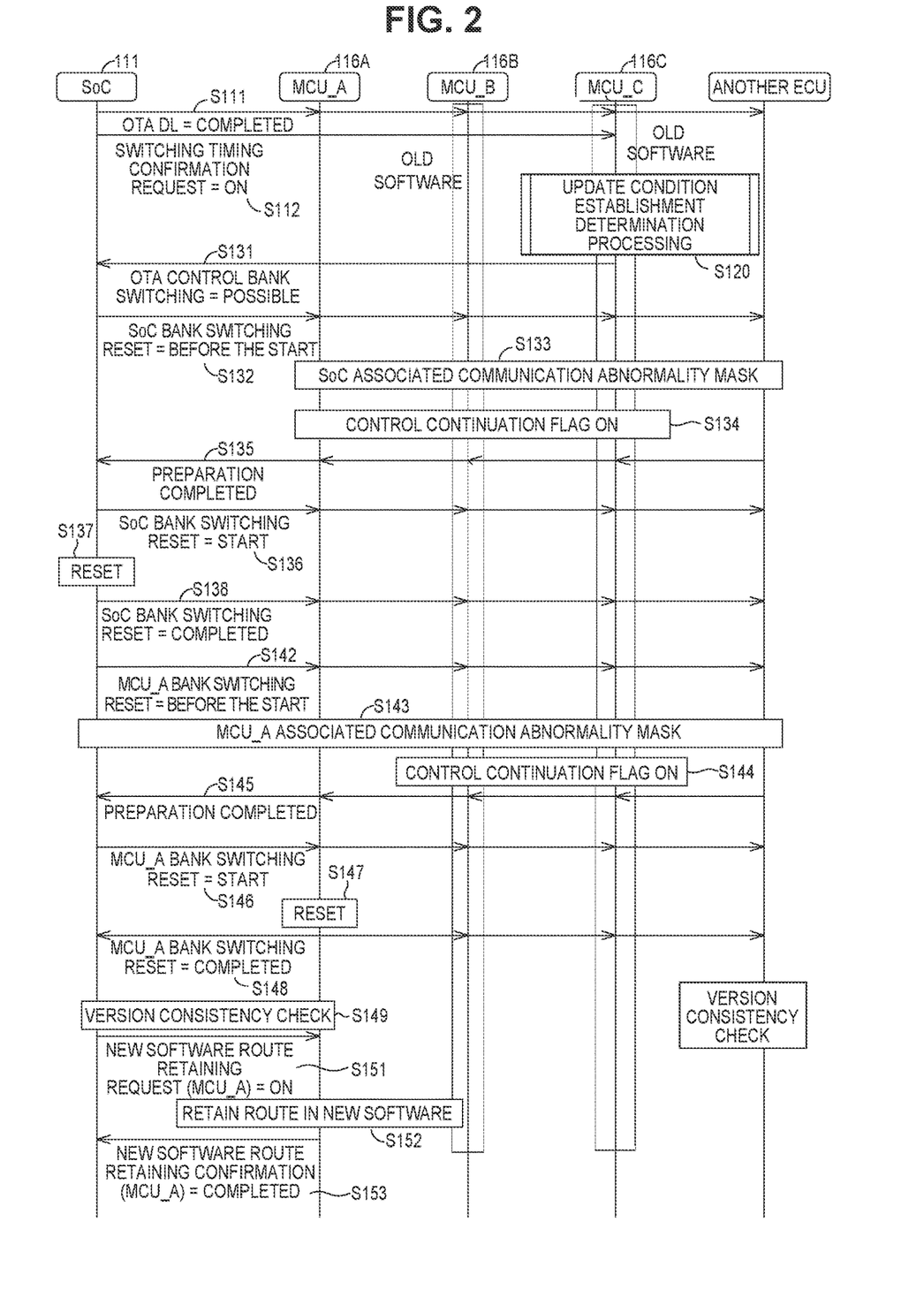
FIG. 2 is a first flowchart illustrating a flow of an update of specific software in an autonomous driving electronic control unit (ECU) according to the present embodiment.
Figure 3:
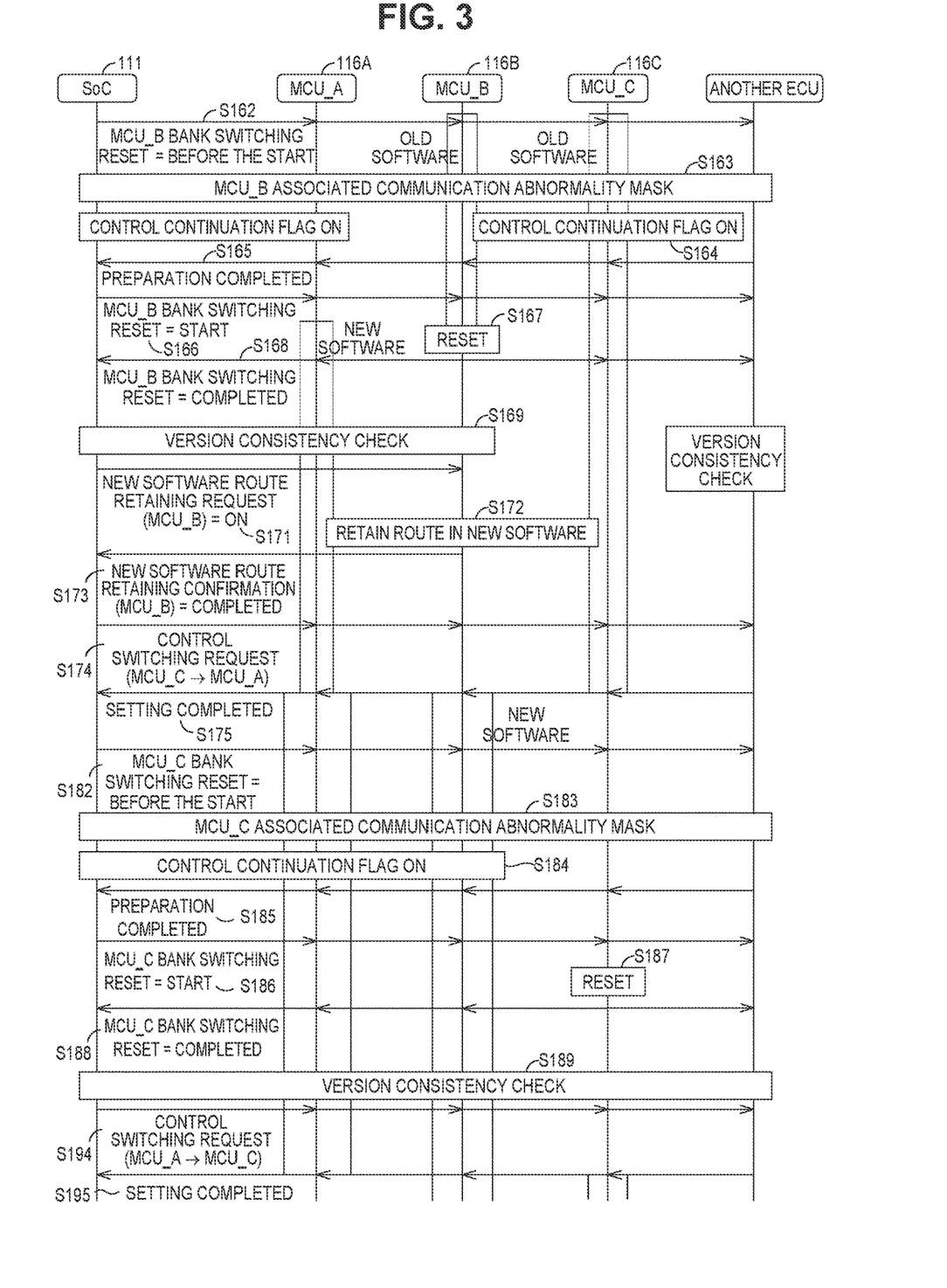
FIG. 3 is a second flowchart illustrating the flow of the update of the specific software in the autonomous driving ECU according to the present embodiment.

FIG. 2 is a first flowchart illustrating a flow of the update of the specific software in the autonomous driving ECU 110 according to the present embodiment. FIG. 3 is a second flowchart illustrating the flow of the update of the specific software in the autonomous driving ECU 110 according to the present embodiment. The specific software is software for executing specific processing (here, processing for the autonomous driving of the vehicle 100) that controls the control targets (here, the power train system 140, the steering system 150, and the brake system 160).

The CPU 112 of the SoC 111 determines whether compatibility exists between the specific processing before updating the specific software and the specific processing after updating the specific software. When the CPU 112 determines that compatibility does not exist and the specific processing is not being executed in any of the MCUs 116A to 116C, the specific software is updated. When the CPU 112 determines that compatibility exists, as described in FIGS. 2 and 3, in the state where the MCU 116 executing the specific processing has been switched to the other MCU 116, the specific software is updated.

For example, when it is determined that compatibility does not exist, it may be a case where a new function is added to the specific software or a case where performance of the specific software is improved. Further, even in the case where a new function is added to the specific software or the case where performance of the specific software is improved, when control instruction values by the specific software are the same, it may be determined that compatibility exists. In a case where no new function is added to the specific software but the control instruction values are not the same, it may be determined that compatibility does not exist.

With reference to FIGS. 2 and 3, first, when a process of downloading the data of the updated specific software (at least part of the software of the MCUs 116A to 116C is common) of the SoC 111 and the MCUs 116A to 116C of the autonomous driving ECU 110 from the update server 200 in the OTA is completed, the CPU 112 of the SoC 111 transmits information indicating that the downloading in the OTA has been completed and the data of the updated specific software to the MCUs 116A to 116C, and transmits the information indicating that the downloading in the OTA has been completed to another ECU that operates in cooperation with the autonomous driving ECU 110 (step S111).

The flash memories included in the memories 113 and 118A to 118C are dual bank flash memories, and include two storage areas (two banks) used for storing programs. Of the two storage areas, one storage area (one bank) that stores the specific software currently being executed is hereinafter referred to as an "active bank", and the other storage area (the other bank) is hereinafter referred to as a "write bank". The CPU 112 of the SoC 111 writes the data of the downloaded updated specific software on the write bank in the flash memory included in the memory 113. Upon receiving the data of the updated specific software, the MCUs 116A to 116C respectively write the data of the downloaded updated specific software on the write bank in the flash memory included in the memories 118A to 118C.

Next, the CPU 112 of the SoC 111 transmits, to the MCU 116C, a request to confirm a timing of switching the specific software (step S112). The specific software executed in the MCUs 116A to 116C is executed by one main MCU 116 and another sub MCU 116 in cooperation. Here, the main MCU 116 is the MCU 116C and the sub MCU 116 is the MCU 116B.

The CPU 117C of the MCU 116C is executing an old version of the specific software as the main MCU 116. The CPU 117B of the MCU 116B is executing an old version of the specific software as the sub MCU 116. When the CPU 117C of the MCU 116C, which is the main MCU 116, receives the request to confirm the timing of switching the specific software, it executes the update condition establishment determination processing (step S120).

Figure 4:
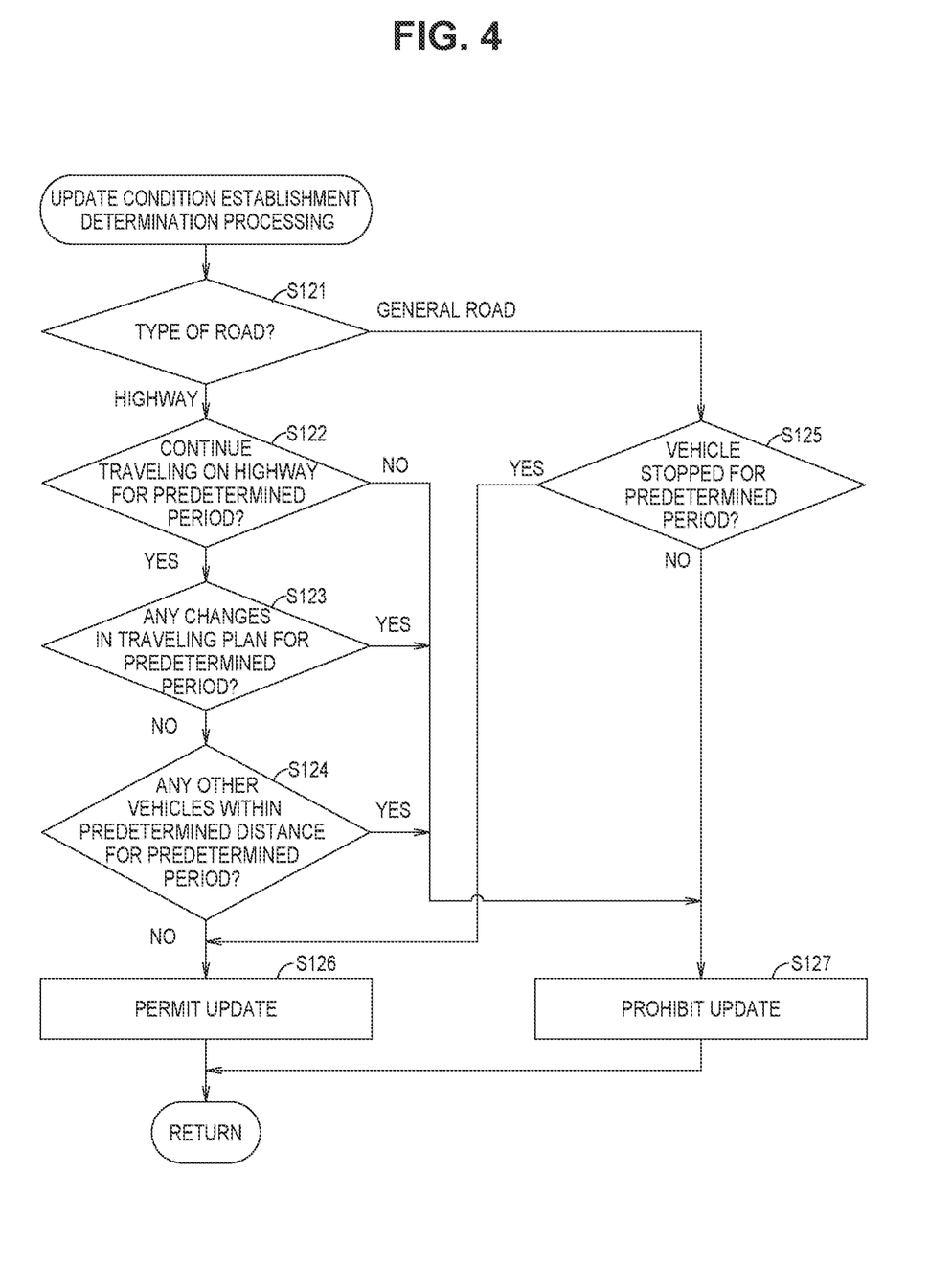
FIG. 4 is a flowchart illustrating a flow of update condition establishment determination processing according to the present embodiment.

FIG. 4 is a flowchart illustrating a flow of the update condition establishment determination processing according to the present embodiment. With reference to FIG. 4, the CPU 117C of the MCU 116C determines whether a type of a road on which the vehicle is currently traveling is a highway (for example, a national highway or a passenger car-only road) or an ordinary road other than the highway (step S121). When the CPU 117C determines that the road on which the vehicle is currently traveling is a highway, the CPU 117C of the MCU 116C determines whether the traveling on the highway is scheduled to continue for a predetermined period thereafter, using the data of a scheduled route from the navigation system 120 (step S122). The predetermined period is equal to or longer than a period required for updating the specific software of the SoC 111 and the MCUs 116A to 116C. The period required for updating the specific software is specified in advance using an actual machine or a simulation. The predetermined period is determined in advance based on the period required for updating the specific software specified in advance.

When the CPU 117C of the MCU 116C determines that the traveling on the highway is continued for the predetermined period (YES in step S122), the CPU 117C determines whether the traveling plan is scheduled to be changed for the predetermined period thereafter (step S123). For example, when a process for changing the traveling plan in the navigation system 120 has not currently been started, the CPU 117C determines that the traveling plan is not scheduled to be changed for the predetermined period.

When the CPU 117C determines that the traveling plan is not scheduled to be changed for the predetermined period (NO in step S123), the CPU 117C of the MCU 116C determines whether it is expected that any other vehicles will exist within a predetermined distance from the vehicle 100 for the predetermined period thereafter (step S124). For example, using a position, approaching speed, distancing speed, and the like of another vehicle in the vicinity specified using information from the various sensors 130 of the vehicle 100, it is determined whether it is expected that no another vehicle will exist within the predetermined distance from the vehicle 100 for the predetermined period.

On the other hand, in step S121, when the CPU 117C determines that the road on which the vehicle is currently traveling is an ordinary road, in a situation where the vehicle is stopped at a red light or in a situation where the vehicle is stopped before a crossing, the CPU 117C of the MCU 116C determines whether the vehicle 100 is scheduled to be stopped during the predetermined period thereafter (step S125). For example, a period until a signal or crossing becomes passable is specified based on the road traffic information acquired in the navigation system 120 or by communicating with the signal or a crossing system.

When the CPU 117C determines that it is expected that no another vehicle will exist within the predetermined distance from the vehicle 100 for the predetermined period (NO in step S124), or when the CPU 117C determines that the vehicle 100 is scheduled to be stopped for the predetermined period (YES in step S125), the CPU 117C of the MCU 116C permits the update of the specific software (step S126). Thereafter, the CPU 117C of the MCU 116C returns a process to be executed to the process that called the update condition establishment determination processing.

When the CPU 117C determines that the traveling on the highway is not continued until the predetermined period elapses (NO in step S122), when the CPU 117C determines that the traveling plan is scheduled to be changed until the predetermined period elapses (YES in step S123), when the CPU 117C determines that it is expected that another vehicle will come within the predetermined distance from the vehicle 100 until the predetermined period elapses (YES in step S124), or when the CPU 117C determines that the vehicle 100 is scheduled to start the traveling from a stop (NO in step S125), the CPU 117C of the MCU 116C prohibits the update of the specific software (step S127). Thereafter, the CPU 117C of the MCU 116C returns a process to be executed to the process that called the update condition establishment determination processing.

Returning to FIG. 2, when the update of the specific software is permitted in step S126 of FIG. 4, the CPU 117C of the MCU 116C transmits, to the SoC 111, information indicating that a control bank can be switched in the update of the specific software in OTA (step S131). Switching the control bank refers to switching between the active bank and the write bank.

Next, the CPU 112 of the SoC 111 transmits to the MCUs 116A to 116C and another ECU, information indicating that resetting for switching the control bank of the SoC 111 has not yet been started (step S132). In response to this, the MCUs 116A to 116C and another ECU mask such communication processing so as not to detect an abnormality in communication associated with the SoC 111 (step S133). The MCUs 116A to 116C turn on a flag to continue control other than such communication processing (step S134). The MCUs 116A to 116C and another ECU transmit to the SoC 111, information indicating that preparation has been completed (step S135).

Next, the CPU 112 of the SoC 111 transmits the information indicating that resetting for switching the control bank of the SoC 111 is started to the MCUs 116A to 116C and another ECU (step S136), and executes resetting for switching the control bank (step S137). After resetting, when the SoC 111 is restarted, the write bank is switched to the active bank. When resetting for switching the control bank is completed, the CPU 112 of the SoC 111 transmits information indicating that resetting has been completed to the MCUs 116A to 116C and another ECU (step S138).

Next, the CPU 112 of the SoC 111 transmits information indicating that resetting for switching the control bank of the MCU 116A has not yet been started to the MCUs 116A to 116C and another ECU (step S142). In response to this, the SoC 111, the MCUs 116B, 116C, and another ECU mask such communication processing so as not to detect an abnormality in communication associated with the MCU 116A (step S143). The MCUs 116B, 116C turn on the flag to continue the control other than such communication processing (step S144). The MCUs 116A to 116C and another ECU transmit information indicating that preparation has been completed to the SoC 111 (step S145).

Next, the CPU 112 of the SoC 111 transmits the information indicating that resetting for switching the control bank of the MCU 116A is started to the MCUs 116A to 116C and another ECU (step S146). The CPU 117A of the MCU 116A executes resetting for switching the control bank (step S147). After resetting, when the MCU 116A is restarted, the write bank is switched to the active bank. When resetting for switching the control bank is completed, the CPU 117A of the MCU 116A transmits the information indicating that resetting has been completed to the SoC 111, the MCUs 116B, 116C and another ECU (step S148). Thereafter, the CPU 112 of the SoC 111, the CPU 117A of the MCU 116A, and another ECU check whether the respective specific software versions are consistent with each other (step S149).

Next, the CPU 112 of the SoC 111 transmits, to the MCU 116A, a request for retaining the current autonomous driving route used in the updated specific software of the MCU 116A (step S151). The CPU 117A of the MCU 116A retains the current autonomous driving route used in the updated specific software (step S152). The CPU 117A of the MCU 116A transmits, to the SoC 111, information indicating that retaining of the current autonomous driving route used in the updated specific software has been confirmed (step S153).

Proceeding to FIG. 3, the CPU 112 of the SoC 111 transmits information indicating that resetting for switching the control bank of the MCU 116B has not yet been started to the MCUs 116A to 116C and another ECU (step S162). In response to this, the CPU 112 of the SoC 111, the CPUs 117A, 117C of the MCUs 116A, 116C, and another ECU mask such communication processing so as not to detect an abnormality in communication associated with the MCU 116B (step S163). The CPU 112 of the SoC 111 and the CPUs 117A, 117C of the MCUs 116A, 116C turn on the flag to continue the control other than such communication processing (step S164). The CPUs 117A to 117C of the MCUs 116A to 116C and another ECU transmit information indicating that preparation has been completed to the SoC 111 (step S165).

Next, the CPU 112 of the SoC 111 transmits information indicating that resetting for switching the control bank of the MCU 116B is started to the MCUs 116A to 116C and another ECU (step S166). The CPU 117B of the MCU 116B executes resetting for switching the control bank (step S167). As such, the operation as the sub MCU 116 of the specific software before the update, which the MCU 116B has been executing, ends. Along with this, the CPU 117A of the MCU 116A detects the fact that the sub MCU 116B executing the specific software has stopped operating, and starts operating as the sub MCU 116 of the specific software. After resetting, when the MCU 116B is restarted, the write bank is switched to the active bank. When resetting for switching the control bank is completed, the CPU 117B of the MCU 116B transmits the information indicating that resetting has been completed to the SoC 111, the MCUs 116A, 116C, and another ECU (step S168). Thereafter, the CPU 112 of the SoC 111, the CPUs 117A, 117B of the MCUs 116A, 116B, and another ECU check whether the respective specific software versions are consistent with each other (step S169).

Next, the CPU 112 of the SoC 111 transmits, to the MCU 116B, a request for retaining the current autonomous driving route used in the updated specific software of the MCU 116B (step S171). The CPU 117B of the MCU 116B retains the current autonomous driving route used in the updated specific software (step S172). The CPU 117B of the MCU 116B transmits, to the SoC 111, information indicating that retaining of the current autonomous driving route used in the updated specific software has been confirmed (step S173).

Next, the CPU 112 of the SoC 111 transmits a request to switch the main MCU 116 that executes the specific software from the MCU 116C to the MCU 116A to the MCUs 116A to 116C and another ECU (step S174). The CPUs 117A to 117C of the MCUs 116A to 116C and another ECU transmit, to the SoC 111, information indicating that setting the main MCU 116 that executes the specific software as the MCU 116A has been completed (step S175). Thereafter, the CPU 117A of the MCU 116A starts operating as the main MCU 116 that executes the updated specific software. Further, the CPU 117B of the MCU 116B starts operating as the sub MCU 116 that executes the updated specific software.

Next, the CPU 112 of the SoC 111 transmits information indicating that resetting for switching the control bank of the MCU 116C has not yet been started to the MCUs 116A to 116C and another ECU (step S182). In response to this, the CPU 112 of the SoC 111, the CPUs 117A, 117B of the MCUs 116A, 116B, and another ECU mask such communication processing so as not to detect an abnormality in communication associated with the MCU 116C (step S183). The CPU 112 of the SoC 111 and the CPUs 117A, 117B of the MCUs 116A, 116B turn on the flag to continue the control other than such communication processing (step S184). The CPUs 117A to 117C of the MCUs 116A to 116C and another ECU transmit information indicating that preparation has been completed to the SoC 111 (step S185).

Next, the CPU 112 of the SoC 111 transmits information indicating that resetting for switching the control bank of the MCU 116C is started to the MCUs 116A to 116C and another ECU (step S186). The CPU 117C of the MCU 116C executes resetting for switching the control bank (step S187). After resetting, when the MCU 116C is restarted, the write bank is switched to the active bank. When resetting for switching the control bank is completed, the CPU 117C of the MCU 116C transmits the information indicating that resetting has been completed to the SoC 111, the MCUs 116A, 116B, and another ECU (step S188). Thereafter, the CPU 112 of the SoC 111, the CPUs 117A to 117C of the MCUs 116A to 116C, and another ECU check whether the respective specific software versions are consistent with each other (step S189).

Next, the CPU 112 of the SoC 111 transmits a request to switch the main MCU 116 that executes the specific software from the MCU 116A to the MCU 116C to the MCUs 116A to 116C and another ECU (step S194). The CPUs 117A to 117C of the MCUs 116A to 116C and another ECU transmit, to the SoC 111, information indicating that setting the main MCU 116 that executes the specific software as the MCU 116C has been completed (step S195). Thereafter, the CPU 117C of the MCU 116C starts operating as the main MCU 116 that executes the updated specific software. Further, the CPU 117B of the MCU 116B starts operating as the sub MCU 116 that executes the updated specific software.

Modified Examples (1) In the above-described embodiment, the control system that can update the software in the OTA has been the autonomous driving ECU 110. However, the control system is not limited thereto, and may be another control system in the vehicle 100, such as a drive control ECU or an ECU that executes processing of the ADAS function.

(2) In the above-described embodiment, the specific processing has been processing for autonomous driving of the vehicle 100. However, the specific processing is not limited thereto, and may be processing for autonomous parking of the vehicle 100 or processing for driver assistance by the ADAS.

(3) In the above-described embodiment, the specific control devices each including the storage unit that stores the specific software for executing the specific processing for controlling the control target, and the control unit that executes the specific software stored in the storage unit and executes the specific processing have been the MCUs 116A to 116C included in the autonomous driving ECU 110. However, the specific control devices are not limited thereto, and may be other control devices in the vehicle 100, such as other sets of MCUs included in another ECU.

(4) In the above-described embodiment, the MCUs 116A to 116C, which are the specific control devices, have been a set of three. However, the MCUs are not limited thereto, and may be a set of two or a set of four or more.

(5) In the above-described embodiment, the switching control device that switches the specific control device that executes the specific processing has been the SoC 111 included in the autonomous driving ECU 110. However, the switching control device is not limited thereto, and may be another control device in the vehicle 100, such as a SoC included in an ECU dedicated to the update control of the software.

(6) In the above-described embodiment, the memories 118A to 118C include flash memories of the dual bank, and the specific software has been updated by switching one storage area (one bank, the active bank) that stores the specific software of a current execution target to the other storage area (the other bank, the write bank) that stores the updated specific software. However, the memories 118A to 118C are not limited thereto, and may include flash memories of the single bank, and the specific software may be updated by rewriting the specific software of the storage area that stores the specific software of the current execution target on the updated specific software.

(7) In the above-described embodiment, as illustrated in FIGS. 2 and 3, a case where the update of the specific software is interrupted in the middle has not been described. However, the present disclosure is not limited thereto, and the update condition establishment determination processing illustrated in FIG. 4 may be executed even in the middle of the update of the specific software, and, when the update condition is not satisfied in the middle, the specific software of the MCUs 116A to 116C may be returned to the specific software before the update. Further, when an update error occurs in the middle, the specific software of the MCUs 116A to 116C may be returned to the specific software before the update.

(8) The above-described embodiment can be regarded as disclosure of a control system that can update software by wireless communication, can be regarded as disclosure of an update control method in the control system that can update the software by wireless communication, and can be regarded as disclosure of a non-transitory storage medium storing functions executed in the control system that can update the software by wireless communication.

Summary (1) As illustrated in FIG. 1, the autonomous driving ECU 110 is the control system that can update the software in the OTA, and includes the MCUs 116A to 116C including the memories 118A to 118C that store the specific software for executing the specific processing for controlling the control target and the CPUs 117A to 117C that execute the specific software stored in the memories 118A to 118C and execute the specific processing, and the SoC 111 that switches the MCUs 116A to 116C that execute the specific processing. As illustrated in FIGS. 2 and 3, when the specific software stored in the memory 118 of the MCU 116 executing the specific processing among the MCUs 116A to 116C is updated, the SoC 111 switches the MCU 116 that executes the specific processing to another MCU 116 before the start of the update (for example, step S175). In a state where the MCU 116 that executes the specific processing has been switched to another MCU 116, the CPU 117 of the MCU 116 updates the specific software stored in the memory 118 (for example, step S187).

As such, when the specific software of the MCU 116 that is executing the specific processing for controlling the control target is updated, the MCU 116 that executes the specific processing is switched to another MCU 116 before the start of the update, and, in the state where the MCU 116 that executes the specific processing has been switched to the other MCU 116, the specific software is updated. As a result, when the software of the autonomous driving ECU 110 is updated, it is possible to restrict the control in the autonomous driving ECU 110 from being influenced.

(2) As illustrated in FIG. 1, the number of MCUs 116A to 116C is three or more, and they execute the specific processing in cooperation with another MCU 116. As illustrated in FIGS. 2 and 3, when any one of the specific software stored in the memories 118A to 118C of the MCUs 116A to 116C executing the specific processing is updated, the SoC 111 switches the MCU 116 that executes the specific processing to another MCU 116 that is not executing the specific processing.

As such, even when a redundant configuration is required such that the MCU 116 executes the specific processing in cooperation with another MCU 116, it is possible to restrict the control in the control system from being influenced and update the software of the MCU 116 while maintaining the redundant configuration.

(3) The CPUs 117A to 117C of the MCUs 116A to 116C determine whether compatibility exists between the specific processing before updating the specific software and the specific processing after updating the specific software stored in the memories 118A to 118C. When the case where it is determined that compatibility does not exist, the specific software may be updated when the specific processing is not being executed in any of the MCUs 116A to 116C. As illustrated in FIGS. 2 and 3, when it is determined that compatibility exists, the specific software is updated in a state where the MCU 116 that executes the specific processing has been switched to another MCU 116.

As such, when compatibility does not exist between the specific processing before updating the specific software and the specific processing after updating the specific software, the specific software is updated when the specific processing is not being executed in any of the MCUs 116. When compatibility exists, the specific software is updated in a state where the MCU 116 that executes the specific processing has been switched to another MCU 116. For this reason, in the situation where the specific processing is being executed, it is possible to prevent the specific processing by executing the incompatible specific software and the specific processing by executing the compatible specific software from being mixed. As a result, it is possible to prevent the specific processing from operating abnormally due to the incompatibility.

(4) As illustrated in FIG. 1, the autonomous driving ECU 110 is mounted on the vehicle 100. As illustrated in FIG. 4, the predetermined condition is a condition that indicates that the traveling situation of the vehicle 100 in which the specific software can be updated is continued for the predetermined period or longer, the predetermined period being a period required for updating the specific software. As illustrated in FIGS. 2 to 4, the CPU 117 of the MCU 116 determines whether the predetermined condition is satisfied, and updates the specific software when the predetermined condition is satisfied.

As such, when the predetermined condition indicating that the traveling situation of the vehicle 100 in which the specific software can be updated is continued for a predetermined period or longer, the predetermined period being a period required for updating the specific software are satisfied, the specific software is updated. As a result, even when the specific processing is being executed in any of the MCUs 116, it is possible to update the specific software of the MCU 116 at the appropriate timing.

(5) As illustrated in FIG. 4, the predetermined condition is the condition where the situation in which the vehicle 100 is traveling on the highway is continued for the predetermined period, the condition where the situation in which the traveling plan of the vehicle 100 is unchanged is continued for the predetermined period, and the condition where the situation in which another vehicle does not exist within the predetermined distance from the vehicle 100 is continued for the predetermined period.

(6) As illustrated in FIG. 4, the predetermined condition is the condition where the situation in which the vehicle 100 is traveling on the ordinary road is continued for the predetermined period, and the condition where the situation in which the vehicle 100 is stopped is continued for the predetermined period.

The embodiment disclosed herein needs to be considered as illustrative in all points and not restrictive. The scope of the present disclosure is shown not by the above description of the embodiments but by the claims, and is intended to include meanings equivalent to the claims and all modifications within the scope thereof.

A first aspect according to the present disclosure is a control system configured to update software by wireless communication. The control system includes a plurality of specific control devices each including one or more memories configured to store specific software for executing specific processing for controlling a control target and one or more processors configured to execute the specific processing by executing the specific software stored in the one or more memories, and a switching control device configured to switch, among the specific control devices, a specific control device that executes the specific processing. When an update of the specific software stored in the one or more memories of the specific control device executing the specific processing among the specific control devices is to be performed, the switching control device switches, among the specific control devices, the specific control device executing the specific processing to another specific control device before starting the update. The one or more processors of the specific control device is configured to, in a state where the specific control device executing the specific processing has been switched to the other specific control device, update the specific software stored in the one or more memories.

With such a configuration, when the specific software of the specific control device executing the specific processing for controlling the control target is to be updated, the specific control device executing the specific processing is switched to another specific control device among the specific control devices before the start of the update, and, in the state where the specific software executing the specific processing has been switched to the other specific control device, the specific software is updated. As a result, it is possible to provide a control system that can restrict the control in the control system from being influenced when the software of the control system is updated.

In the first aspect, the number of specific control devices may be three or more. The specific control devices may be configured to execute the specific processing in cooperation with each other. When any one piece of the specific software stored in the memories of each of the specific control devices executing the specific processing is to be updated, the switching control device may be configured to switch, among the specific control devices, the specific control device executing the specific processing to the other specific control device that is not executing the specific processing.

With such a configuration, even when a redundant configuration is required such that the specific control device executing the specific processing executes the specific processing in cooperation with the other specific control device, it is possible to restrict the control in the control system from being influenced and update the software of the specific control device while maintaining the redundant configuration.

In the first aspect, the one or more processors of the specific control device may be configured to: determine whether compatibility exists between the specific processing before updating the specific software and the specific processing after updating the specific software; in a case where determining that the compatibility does not exist, update the specific software when the specific processing is not being executed in any of the specific control devices; and in a case where determining that the compatibility exists, update the specific software when the specific control device executing the specific processing has been switched to the other specific control device.

With such a configuration, when compatibility does not exist between the specific processing before updating the specific software and the specific processing after updating the specific software and the specific processing is not being executed in any of the specific control devices, the specific software is updated. When compatibility exists between the specific processing before updating the specific software and the specific processing after updating the specific software and in the state where the specific control device executing the specific processing has been switched to the other specific control device, the specific software is updated. For this reason, in a situation where the specific processing is being executed, it is possible to prevent the specific processing by executing the incompatible specific software between the specific processing before updating the specific software and the specific processing after updating the specific software and the specific processing by executing the compatible specific software between the specific processing before updating the specific software and the specific processing after updating the specific software from being mixed. As a result, it is possible to prevent the specific processing from operating abnormally because compatibility does not exist between the specific processing before updating the specific software and the specific processing after updating the specific software.

In the first aspect, the control system may be mounted on a vehicle. The one or more processors of the specific control device may be configured to determine whether the predetermined condition is satisfied, and update the specific software when the predetermined condition is satisfied. The predetermined condition may be a condition that a traveling situation of the vehicle in which the specific software that is updatable is continued for a predetermined period or longer, the predetermined period being a period required for updating the specific software.

With such a configuration, when the predetermined condition is satisfied that the traveling situation of the vehicle in which the specific software can be updated is continued for a predetermined period or longer and the predetermined period is a period required for updating the specific software, the specific software is updated. As a result, even when the specific processing is being executed in any of the specific control devices, it is possible to update the specific software of the specific control device at an appropriate timing.

In the first aspect, the predetermined condition may be a condition that a situation in which the vehicle is traveling on a highway is continued for a predetermined period, a situation in which a traveling plan of the vehicle is unchanged is continued for the predetermined period, and a situation in which another vehicle does not exist within a predetermined distance from the vehicle is continued for the predetermined period.

In the first aspect, the predetermined condition may be a condition that a situation in which the vehicle is traveling on an ordinary road is continued for the predetermined period, and a situation in which the vehicle is stopped is continued for the predetermined period.

A second aspect of the present disclosure is an update control method in a control system configured to update software by wireless communication. The control system includes a plurality of specific control devices each including one or more memories configured to store specific software for executing specific processing for controlling a control target and one or more processors configured to execute the specific processing by executing the specific software stored in the one or more memories, and a switching control device configured to switch, among the specific control devices, a specific control device that executes the specific processing. When the switching control device performs an update of the specific software stored in the one or more memories of the specific control device executing the specific processing among the specific control devices, the update control method includes switching, among the specific control devices, the specific control device that executes the specific processing to another specific control device before starting the update, and updating, by the one or more processors of the specific control device, the specific software stored in the one or more memories in a state where the specific control device that executes the specific processing has been switched to the other specific control device.

With such a configuration, when the software of the control system is updated, it is possible to provide the update control system that can restrict the control in the control system from being influenced.

A third aspect of the present disclosure is a non-transitory storage medium storing instructions that are executable in one or more processors of a control system configured to update software by wireless communication and that cause the one or more processors to execute functions. The control system includes a plurality of specific control devices each including one or more memories configured to store specific software for executing specific processing for controlling a control target and one or more processors configured to execute the specific processing by executing the specific software stored in the one or more memories, and a switching control device configured to switch, among the specific control devices, a specific control device that executes the specific processing. The functions include switching, among the specific control devices, when the switching control device performs an update of the specific software stored in the one or more memories of the specific control device executing the specific processing among the specific control devices, the specific control device that executes the specific processing to another specific control device before starting the update, and updating, by the one or more processors of the specific control device, the specific software stored in the one or more memories in a state where the specific control device that executes the specific processing has been switched to the other specific control device.

With such a configuration, when the software of the control system is updated, it is possible to provide the non-transitory storage medium that stores the instructions to execute the functions that can restrict the control in the control system from being influenced.

What is claimed is:

1. A control system configured to update software by wireless communication, the control system comprising:
   a plurality of specific control devices each including
      one or more memories configured to store specific software for executing specific processing for controlling a control target, and
      one or more processors configured to execute the specific processing by executing the specific software stored in the one or more memories; and
   processing circuitry configured to:
   switch, among the plurality of specific control devices, a specific control device that executes the specific processing; and,
   when an update of the specific software stored in the one or more memories of the specific control device executing the specific processing among the plurality of specific control devices is to be performed, switch execution, among the plurality of specific control devices, from the specific control device executing the specific processing to another specific control device that is not executing the specific processing before starting of the update;
   the one or more processors of the specific control device are further configured to, in a state where the specific control device executing the specific processing has been switched to the other specific control device, update the specific software stored in the one or more memories; and
   the one or more processors of the other specific control device are further configured to, after the specific control device executing the specific processing has been switched to the other specific control device, execute the specific processing by executing the specific software stored in the one or more memories.

2. The control system according to claim 1, wherein:
   the number of the plurality of specific control devices is three or more;
   the plurality of specific control devices are further configured to execute the specific processing in cooperation with each other; and
   the processing circuitry is further configured to, when any one piece of the specific software stored in the memories of the plurality of specific control devices executing the specific processing is to be updated, switch execution, among the plurality of specific control devices, from the specific control device executing the specific processing to the other specific control device that is not executing the specific processing.

3. The control system according to claim 1, wherein:
the one or more processors of the specific control device are further configured to:
determine whether compatibility exists before updating the specific software and after updating the specific software;
in a case where determining that the compatibility does not exist before updating the specific software, update the specific software when the specific processing is not being executed in any of the plurality of specific control devices; and
in an alternate case where determining that the compatibility exists before updating the specific software, update the specific software when the specific control device executing the specific processing has been switched to the other specific control device.

4. The control system according to claim 1, wherein:
the control system is mounted on a vehicle;
the one or more processors of the specific control device are further configured to:
determine whether a predetermined condition is satisfied; and
update the specific software when the predetermined condition is satisfied; and
the predetermined condition is a condition that a traveling situation of the vehicle in which the specific software is updatable is continued for a predetermined period or longer, the predetermined period being a period required for updating the specific software.

5. The control system according to claim 4, wherein the predetermined condition is at least one of
a first situation in which the vehicle is traveling on a highway is continued for the predetermined period,
a second situation in which a traveling plan of the vehicle is unchanged is continued for the predetermined period, or
a third situation in which another vehicle does not exist within a predetermined distance from the vehicle is continued for the predetermined period.

6. The control system according to claim 4, wherein the predetermined condition is at least one of
a first situation in which the vehicle is traveling on an ordinary road is continued for the predetermined period, or
a second situation in which the vehicle is stopped is continued for the predetermined period.

7. The control system according to claim 1, wherein:
the processing circuitry is further configured to return execution of the specific processing from the other specific control device to the specific control device, that was executing the specific processing before the switching.

8. The control system according to claim 1, wherein:
the processing circuitry is further configured to transmit a request to confirm a timing of switching the specific software to the specific control device executing the specific processing, and switch the specific control device executing the specific processing, in response to the reception of information indicating that the update of the specific software is permitted.

9. An update control method in a control system configured to update software by wireless communication,
the control system including
a plurality of specific control devices each including one or more memories configured to store specific software for executing specific processing for controlling a control target and one or more processors configured to execute the specific processing by executing the specific software stored in the one or more memories, and
processing circuitry configured to switch, among the plurality of specific control devices, a specific control device that executes the specific processing,
the update control method comprising:
switching execution, among the plurality of specific control devices, when the processing circuitry performs an update of the specific software stored in the one or more memories of the specific control device executing the specific processing among the plurality of specific control devices, from the specific control device that executes the specific processing to another specific control device that is not executing the specific processing before starting the update;
updating, by the one or more processors of the specific control device, the specific software stored in the one or more memories in a state where the specific control device that executes the specific processing has been switched to the other specific control device; and
after the specific control device executing the specific processing has been switched to the other specific control device, executing, by the one or more processors of the other specific control device, the specific processing by executing the specific software stored in the one or more memories.

10. A non-transitory storage medium storing instructions that are executable in one or more processors of a control system configured to update software by wireless communication and that cause the one or more processors to execute functions,
the control system including:
a plurality of specific control devices each including one or more memories configured to store specific software for executing specific processing for controlling a control target and one or more processors configured to execute the specific processing by executing the specific software stored in the one or more memories; and
processing circuitry configured to switch, among the plurality of specific control devices, a specific control device that executes the specific processing, and
the functions comprising:
switching execution, among the plurality of specific control devices, when the processing circuitry performs an update of the specific software stored in the one or more memories of the specific control device executing the specific processing among the plurality of specific control devices, from the specific control device that executes the specific processing to another specific control device that is not executing the specific processing before starting the update;
updating, by the one or more processors of the specific control device, the specific software stored in the one or more memories in a state where the specific control device that executes the specific processing has been switched to the other specific control device; and
after the specific control device executing the specific processing has been switched to the other specific control device, executing, by the one or more processors of the other specific control device, the specific processing by executing the specific software stored in the one or more memories.

\* \* \* \* \*